(12) United States Patent  
Clarke et al.

(10) Patent No.: US 7,973,286 B2
(45) Date of Patent: Jul. 5, 2011

(54) DETECTOR HAVING A THIN FILM OF BORON NITRIDE (BN) SUCH AS CUBIC BN AND METHOD, SYSTEMS AND ARRAY UTILIZING SAME

(75) Inventors: Roy Clarke, Ann Arbor, MI (US); Codrin N. Cionca, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 12/131,519

(22) Filed: Jun. 2, 2008

(65) Prior Publication Data

US 2008/0296506 A1 Dec. 4, 2008

Related U.S. Application Data

(60) Provisional application No. 60/933,025, filed on Jun. 4, 2007.

(51) Int. Cl.
*G01T 3/08* (2006.01)
(52) U.S. Cl. .......... 250/370.05; 250/390.01; 250/390.02
(58) Field of Classification Search ............... 250/269.4, 250/269.5, 370.05, 390.01–392
See application file for complete search history.

(56) References Cited

U.S. PATENT DOCUMENTS

| | | | |
|---|---|---|---|
| 5,334,840 A | 8/1994 | Newacheck | |
| 5,399,863 A | 3/1995 | Carron et al. | |
| 5,940,460 A | 8/1999 | Seidel et al. | |
| 5,969,359 A | 10/1999 | Ruddy et al. | |
| 6,479,826 B1 | 11/2002 | Klann et al. | |
| 6,545,281 B1 | 4/2003 | McGregor et al. | |
| 6,624,423 B2 | 9/2003 | Leist et al. | |
| 6,727,504 B1 | 4/2004 | Doty | |
| 6,771,730 B1 | 8/2004 | Dowben et al. | |
| 6,921,903 B2 | 7/2005 | McGregor | |
| 7,034,307 B2 * | 4/2006 | Sane et al. | 250/370.05 |
| 7,148,106 B2 * | 12/2006 | Joo et al. | 438/257 |
| 7,164,138 B2 | 1/2007 | McGregor et al. | |
| 7,372,009 B1 | 5/2008 | Losee et al. | |
| 7,745,800 B1 * | 6/2010 | McGinnis | 250/390.01 |
| 2004/0084626 A1 * | 5/2004 | McGregor | 250/390.01 |
| 2006/0054863 A1 * | 3/2006 | Dai et al. | 252/301.4 R |
| 2006/0291606 A1 | 12/2006 | McGregor et al. | |

(Continued)

FOREIGN PATENT DOCUMENTS

EP 581422 A1 2/1994

(Continued)

OTHER PUBLICATIONS

Glenn F. Knoll, Radiation Detection and Measurement, Third Edition, Chapter 2, Sec. IV., 2000, pp. 55-57.

(Continued)

*Primary Examiner* — David P Porta
*Assistant Examiner* — Casey Bryant
(74) *Attorney, Agent, or Firm* — Brooks Kushman P.C.

(57) ABSTRACT

A detector having a thin film of boron nitride (BN) such as cubic BN, and method, system and array utilizing same are provided. Solid-state p-i-n, deep depletion p-n and Schottky diode detector devices based on a thin film of semiconducting cubic BN are provided. Miniaturized solid-state detectors based on cubic boron nitride have a broad range of applications, both civilian and military.

18 Claims, 2 Drawing Sheets

U.S. PATENT DOCUMENTS

2008/0128628 A1* 6/2008 Moses et al. ............ 250/370.05
2009/0302226 A1* 12/2009 Schieber et al. ......... 250/370.02

FOREIGN PATENT DOCUMENTS

WO      2006/085307     8/2006
WO      WO2007109535    9/2007

OTHER PUBLICATIONS

Glenn F. Knoll, Radiation Detection and Measurement, Third Edition, Chapter 4, 2000, pp. 103-128.
Glenn F. Knoll, Radiation Detection and Measurement, Third Edition, Chapter 14, 2000, pp. 505-535.
Glenn F. Knoll, Radiation Detection and Measurement, Third Edition, Chapter 18, 2000, pp. 685-710.
Litvinov, Dmitri, et al., Reduced Bias Growth of Pure-Phase Cubic Boron Nitride, Applied Phys. Lett. 71(14), Oct. 5, 1997, pp. 1969-1971.
Kidner, S., et al., Low Energy Kinetic Threshold in the Growth of Cubic Boron Nitride Films, Appl. Phys. Lett. 64 (14), Apr. 4, 1994, pp. 1859-1861.
Litvinov Dmitri, et al., Semiconducting Cubic Boron Nitride, Elsevier Science B.V., Diamond and Related Materials 7, 1998, pp. 360-364.
Litvinov, Dmitri, et al., In Situ Texture Monitoring for Growth of Oriented Cubic Boron Nitride Films, Appl. Phys. Lett. vol. 74, No. 7, Feb. 15, 1999, pp. 955-957.
Domestic Nuclear Detection Office, Office of Transformational Research and Development, Department of Homeland Security, Broad Agency Announcement 06-01, Exploratory Research in Nuclear Detection Technology, Federal Register, Mar. 3, 2006, pp. 1-43.
Domestic Nuclear Detection Office, Office of Transformational Research and Development, Department of Homeland Security, Broad Agency Announcement 06-02, Advanced Technology Demonstration in Nuclear Detection Technology for Intelligent Personal Radiation Locators, Federal Register, Apr. 4, 2006, pp. 1-37.
International Search Report and Written Opinion dated Jan. 2, 2009 for the corresponding PCT Serial No. US2008/065721 filed Jun. 4, 2008.

* cited by examiner

DETECTOR HAVING A THIN FILM OF BORON NITRIDE (BN) SUCH AS CUBIC BN AND METHOD, SYSTEMS AND ARRAY UTILIZING SAME

CROSS-REFERENCE TO RELATED APPLICATION

This application claims the benefit of U.S. Provisional Application Ser. No. 60/933,025 filed Jun. 4, 2007.

STATEMENT REGARDING FEDERALLY SPONSORED RESEARCH OR DEVELOPMENT

This invention was made with government support under N66001-03-D-0042 awarded by NAVY/SPAWAR. The government has certain rights in the invention.

BACKGROUND OF THE INVENTION

1. Field of the Invention

This invention relates to detectors having a thin film of boron nitride (BN) such as cubic BN and methods, systems and arrays utilizing same.

2. Background Art

The following references are related to the invention and may be referenced herein:
1. G. F. Knoll, "Radiation detection and measurement," 3 edition, Wiley, 2000.
2. See, Broad Area Announcement on Nuclear Materials and Security, Department of Homeland Security, Federal Register, 2006.
3. D. Litvinov and Roy Clarke, "Reduced bias growth of pure-phase cubic boron nitride," Appl. Phys. Lett. 71, 1969-1971 (1997).
4. S. Kidner, C. A. Taylor and Roy Clarke, "Low-Energy Kinetic Threshold In The Growth Of Cubic Boron-Nitride Films," Appl. Phys. Lett. 64, 1859-1861 (1994).
5. D. Litvinov, C. A. Taylor and Roy Clarke, "Semiconducting cubic boron nitride," Diamond and Related Materials 7, 360-364 (1998).
6. D. Litvinov and Roy Clarke, "In Situ Texture Monitoring for Growth of Oriented Cubic Boron Nitride Films," Appl. Phys. Lett. 74, 955-957 (1999).

Miniaturized solid-state detectors have a very broad range of applications, both civilian and military [1]. In particular, personal radiation monitoring devices, covert radiation monitoring, border inspections, detection of illicit trafficking of nuclear materials, and nuclear power industry personnel protection, are all areas that can benefit from the proposed technology. Neutron detection is a key element in all border control strategies [2].

The technical difficulty in achieving an efficient neutron detector comes from the way neutrons interact with matter. From this point of view, they are fundamentally different than alpha, beta and electromagnetic radiation. These three types of radiation are categorized as ionizing radiation because they produce ion-electron pairs as they travel through matter. Alpha and beta types of radiation consist of electrically charged particles; they can easily interact (via Coulomb forces) with the electrons in the atomic layers and transform them to free carriers. Electromagnetic radiation also interacts with the electron shells to a greater or lesser extent, depending on the photon energy. Once free carriers are generated, they are usually collected on electrodes with the help of an electric field created by the means of an applied bias voltage.

In contrast, neutrons are normally detected by participating in nuclear reactions. Compared with the other types of radiation mentioned above, this is a fundamentally different type of interaction. In order to translate the result of this type of interaction into a measurable electrical signal, an intrinsic mechanism must be used to transfer energy between the nucleus and the atomic electronic shells. Commonly, detector applications utilize other particles that result from neutron capture reactions to achieve this goal: charged particles (alpha) or gamma photons can trigger avalanche carrier generation (in the case of detectors) or can produce another form of detectable signal (visible light, in the case of scintillating layers).

Neutrons are relatively difficult to observe because, in general, they only interact with select nuclei and the interaction probability is small. Since the interaction medium normally has a low density (liquid or gas), the usual approach to increase the overall interaction probability is to increase the neutron path inside the material.

Current neutron based nuclear material detection is based mainly on gas-filled neutron capture chambers. An immediate consequence is that the size of the detector increases accordingly, this being the reason why state of the art neutron detectors are currently large and cumbersome.

Boron (isotope 10) has a high capture cross-section for thermal neutrons and has long been used (mostly in gaseous form) in nuclear detection technology. Of all isotopes likely to interact with thermal neutrons, $^{10}B$ has three properties that make it extremely attractive from the detector application point of view: a) the reaction yields a very energetic alpha particle that can produce copious charge carriers in the surrounding material:

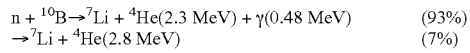

| | |
|---|---|
| n + $^{10}B \rightarrow ^{7}Li$ + $^{4}He$(2.3 MeV) + γ(0.48 MeV) | (93%) |
| $\rightarrow ^{7}Li$ + $^{4}He$(2.8 MeV) | (7%) |

Because of its electrical charge, the alpha particle interacts easier with the surrounding material to produce charge carriers. The most common reaction path (93%) also yields a 0.48 MeV gamma photon. However, because boron has a small number of electrons, the number of carriers produced by the gamma photon is negligible compared to that produced by the alpha particle; b) $^{10}B$ has among the largest probability of interaction with the thermal neutrons, described by the neutron capture cross section of 3837 barn [1]; and c) the natural abundance of isotope $^{10}B$ is relatively large (~19.7%), making it relatively inexpensive.

Solid state neutron detectors are disclosed in U.S. Pat. No. 6,921,903 (which utilizes CdZnTe-based material) and U.S. Pat. No. 6,727,504 (which describes detectors based on bulk (hexagonal/pyrolytic) form of BN).

In the design described in U.S. Pat. No. 6,727,504 an electric field is applied across a slab of BN (hexagonal, in pyrolytic form) and the signal produced by the alpha particles is recorded in the form of a current peak. Since h-BN is highly insulating, the collection of the charge carriers produced by the neutron capture event has a very low efficiency.

U.S. Pat. Nos. 5,940,460 and 5,969,359 disclose a diode that works in conjunction with a neutron conversion layer. The neutron passes through the neutron conversion layer and, if it is absorbed by a nucleus (B, Li etc.), will produce an alpha particle that can be detected by the semiconductor diode. In other words, the neutrons are converted into alpha particles in a conversion layer outside the semiconductor device. A similar situation is met in x-ray detection where photons can be converted into light in a phosphor and the light converted into an electrical signal in a diode—an approach referred to as indirect detection. A drawback comes from the fact that the neutrons are absorbed outside the devices, again reducing the overall efficiency. A significant fraction of the alpha particles (approximately half) will have momentum pointing in a direction away from the diodes. Another disadvantage is the charge reabsorption outside the detection element (the diode). The thicker the conversion layers, the more absorbed neutrons but the thicker the layers, the more alpha particles get reabsorbed.

Other relevant patent documents include: U.S. Pat. Nos. 5,334,840; 6,479,826; 6,545,281; 6,624,423; 6,771,730; 7,034,307; 7,164,138; 7,372,009; U.S. Publication 2006/0291606; and WO 2007/109535.

SUMMARY OF THE INVENTION

A boron nitride detector constructed in accordance with at least one embodiment of the invention of this application overcomes many of the limitations of the prior art by directly detecting the neutrons inside the active boron nitride medium.

An object of at least one embodiment of the present invention is to provide a detector having a thin film of BN and method, system and array utilizing same, wherein neutrons are detected inside the active boron nitride medium.

In carrying out the above object and other objects of the present invention, a solid state detector is provided. The solid state detector includes a substrate and a thin film of BN deposited onto the substrate and is responsive to energetic neutrons incident thereon to produce charged reaction particles and to detect the charged reaction particles within the thin film.

The charged reaction particles may include alpha particles. The thin film of BN may be thick enough to capture substantially all of the energy of the alpha particles.

The BN may be cubic BN.

The BN may be a hexagonal form of BN.

The BN may be a nanocrystalline form of BN.

The BN may be a turbostratic form of BN.

The BN may be an amorphous form of BN.

The BN may be in the form of doped n-type.

The BN may be in the form of doped p-type.

The BN may be in the form of a p-i-n diode.

The substrate may be a semiconductor substrate.

The semiconductor may be intrinsic.

The semiconductor may be a doped n-type semiconductor.

The semiconductor may be a doped p-type semiconductor.

Further in carrying out the above object and other objects of the present invention, a method for measuring neutron emissions is provided. The method includes positioning at least one solid-state detector having a thin film of BN to receive the neutron emissions, the concentration of boron being sufficient to generate neutron-induced ionizing radiation in response to neutron absorptions and for generating an electrical signal in response to the neutron absorptions. The method also includes processing the electrical signal to obtain a measurement of the neutron emissions.

Still further in carrying out the above object and other objects of the present invention, a system for measuring neutron emissions includes at least one solid-state detector having a thin film of BN to receive the neutron emissions. The concentration of boron is sufficient to generate neutron-induced ionizing radiation in response to neutron absorptions and for generating an electrical signal in response to the neutron absorptions. The system also includes a signal processor for processing the electrical signal to obtain a measurement of the neutron emissions.

Yet still further in carrying out the above object and other objects of the present invention, an array of solid-state detectors for measuring neutron emissions is provided. Each of the detectors has a thin film of BN to receive the neutron emissions. The concentration of boron is sufficient to generate neutron-induced ionizing radiation in response to neutron absorptions and for generating an electrical signal in response to the neutron absorptions.

Still further in carrying out the above object and other objects of the present invention, an imaging system for imaging neutron emissions is provided. The system includes an array of solid-state detectors. Each of the detectors has a thin film of BN to receive the neutron emissions. The concentration of boron is sufficient to generate neutron-induced ionizing radiation in response to neutron absorptions and for generating an electrical signal in response to the neutron absorptions. The system also includes an array of sheets of high-density material for separating adjacent solid-state detectors.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 4A:
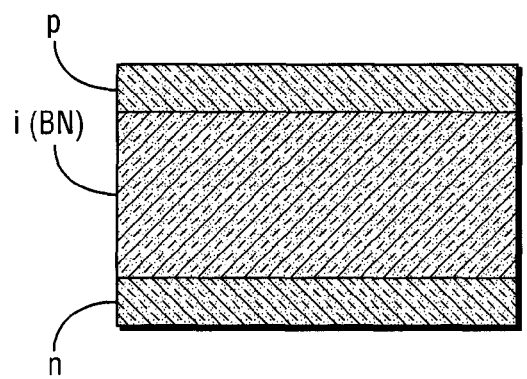
FIG. 4a is a side schematic view of a boron nitride diode detector architecture and, in particular, a p-i-n planar diode with a BN intrinsic layer.
Figure 4B:
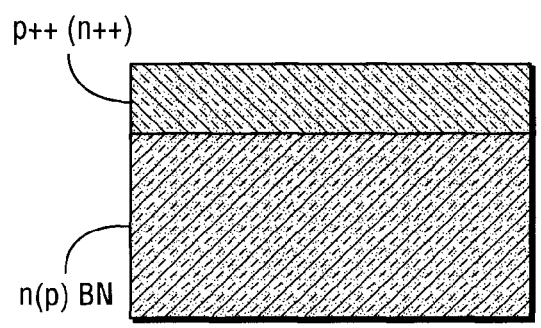
FIG. 4b is a side schematic view of a boron nitride diode detector architecture and, in particular, a deep depletion p-n diode.

Briefly, a detector having a thin film of cubic BN and a method, systems and an array utilizing same are provided. The detector may be a diode detector based on thin semiconductor films of the cubic form of boron nitride. The advantage of the cubic form of BN for this type of application lies in the synergy between the semiconductor behavior and the ability to capture neutrons [1, 3, 4, 5]. Since it is a semiconductor, it can be doped both p- and – type. This feature enables the implementation of a p-i-n device (i.e., FIG. 4a), a deep depletion p-n device (i.e., FIG. 4b) and a Schottky device (not shown). Such a solid-state detector device is based on planar arrangements such as p-n, p-i-n or Schottky, where, for every type of structure, at least one of the p-, – and i-layers refer to thin films of cubic BN. However, it is to be understood that there are a variety of diode architectures that are possible with the detector of the present invention.

The term "thin film" refers more to the manner in which the film is deposited onto the substrate, as opposed to the actual thickness of the film. Thin films are typically deposited by a vacuum deposition technique or by electroplating.

In at least one embodiment of the invention, the detector comprises a diode structure that operates in a reverse-bias regime. In this regime, the majority carriers given by the impurities in the material are blocked by the junction barrier. All three diode architectures involve a thick cubic BN layer for the neutron capture to take place.

Referring again to FIG. 4a, the p-i-n structure contains three regions with three doping levels: a region that is p-doped, an intrinsic region and an n-doped region. The presence of the intrinsic region is meant to allow for the neutron detection and it should be as thick as possible to increase the quantum efficiency of the device (the percentage of the incident particles that trigger an event detectable at the electrodes). Since the lifetime in the intrinsic region is, in general, significantly higher than that corresponding to the doped regions, this layer provides an additional capture region while maintaining a high probability to capture the carriers.

One p-i-n structure that can be built includes a bottom electrode layer, n- or p-doped semiconductor substrate; an insulating layer of c-BN; and a top layer of poly-Si, p- or n-doped, respectively. The device includes c-BN films deposited using thin film deposition techniques.

Referring again to FIG. 4b, the second type of diode is a deep depletion p-n diode in which at least the deep depletion region comprises c-BN. The thickness of the deep depleted layer should be as large as possible in order to allow for the capture of a large fraction of the incident neutrons.

Figure 1:
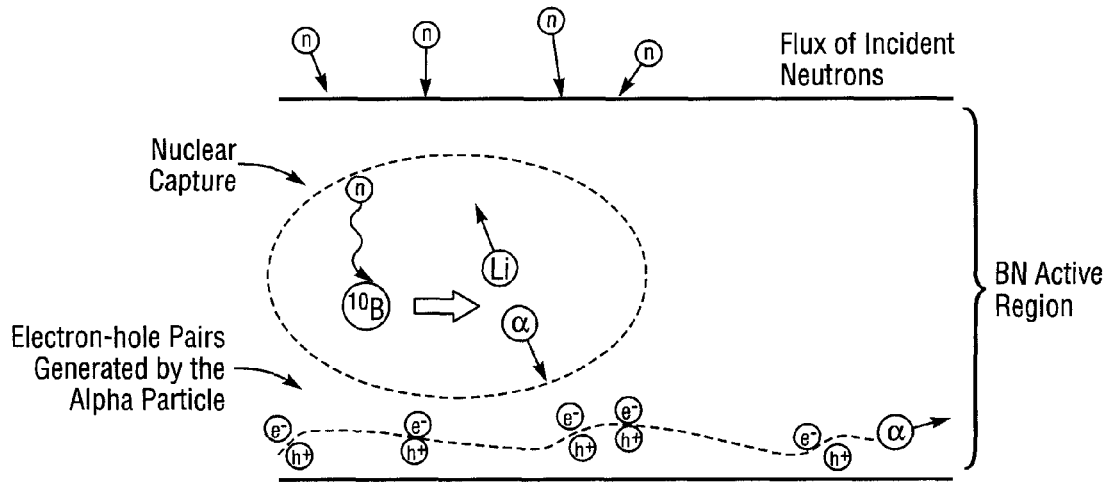
FIG. 1 is a schematic view of a boron nitride solid-state neutron detector in which a boron nucleus captures a thermal neutron, which, in turn, transmutes to lithium 7 and emits an energetic alpha particle; the alpha particle excites electron-hole pairs along its path which are subsequently detected as a charge pulse.

When a neutron is captured by a boron nucleus, a nuclear reaction occurs and yields an alpha particle with high kinetic energy (FIG. 1). An estimate indicates that, for every neutron captured, approximately $1 \times 10^5$ electron-hole pairs can be generated.

Thus, every nuclear detection event generates a burst of minority carriers and the electric field in the junction will facilitate their collection at the electrodes of the diode device or architecture. Careful engineering of the device and reverse bias operation allow for a controlled avalanche effect coupled with this type of interaction, creating thus a single neutron detector diode. This electrical signal produced is further amplified using a charge amplifier.

In a diode with an active layer of cubic BN thick enough to capture substantially the whole energy of the alpha particles the average number of electron-hole pairs generated is proportional to the energy of the alpha particle. If the incident neutron is non-thermal and carries additional kinetic energy, the value of this energy will be added to the total energy of the alpha particle. Therefore, for a non-thermal neutron, the value of the charge pulse generated by a nuclear capture event will increase linearly with the energy of the incident neutron. The output of a charge amplifier of the measuring circuit can be connected to a Multi Channel Analyzer of the measurement circuit and this mechanism adds energy resolution capabilities to this device.

Figure 2:
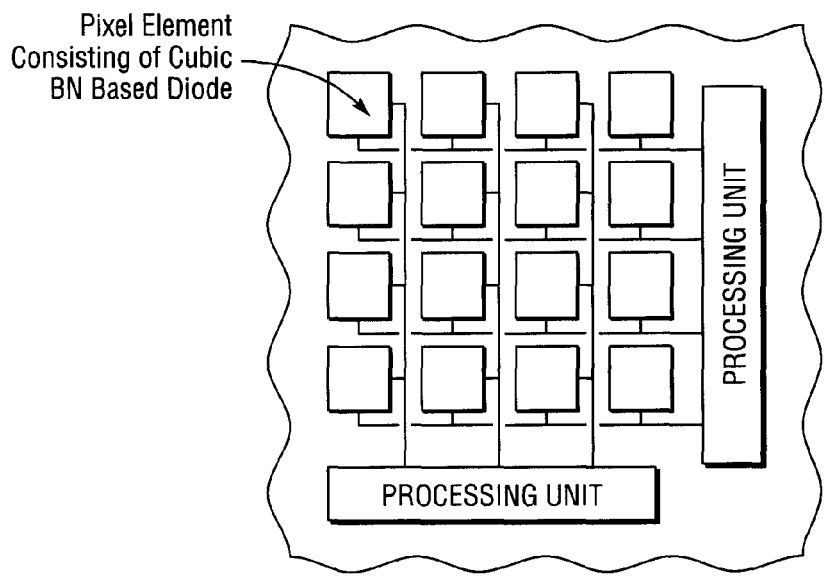
FIG. 2 is a schematic view, partially broken away, of a matrix or array of diode detectors coupled to a signal processor or processing unit and separated by an array of sheets of high-density material (not shown for purposes of clarity) to form an imaging system.

The device described above can be operated alone or as an element of an array (FIG. 2). Given the reduced size of such solid state array compared to the current state of the art (i.e., gas detectors), it can be the core element of portable/miniaturized neutron radiography setup.

Figure 3:
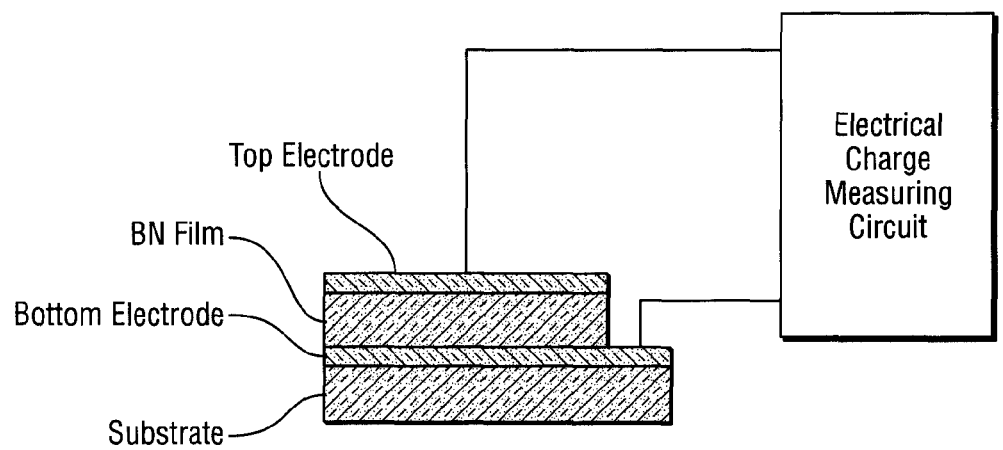
FIG. 3 is a schematic view of the detector of FIG. 1 including an electrical charge measuring circuit.

The detector of FIG. 1 and an electrical charge measuring circuit are illustrated in FIG. 3. In the circuit a voltage from a DC power supply is applied across the electrodes. Carriers created by the neutron conversion event are drifted some distance within the thin film resulting in a fast current or charge pulse. The current is integrated across a capacitor in a charge sensitive preamplifier. This step-function pulse is then amplified and shaped by a spectroscopy amplifier to reduce noise and false triggering of the circuit. This shaped pulse is then used to trigger a signal measuring means such as an oscilloscope (not shown) or some other measurement or recording device, such as a multichannel analyzer of the circuit.

Advantages accruing to at least one embodiment of the invention are numerous, such as: miniaturization, integration with silicon or gallium arsenide integrated circuit technology, solid-state vs. existing pressurized gas designs (can be installed on commercial aircraft and in remote locations via wireless interfaces), disposable wristwatch-sized wearable device, inexpensive compared to current technology (boron-nitride and silicon materials are plentiful and cheap). All security personnel, military service personnel, and civilian nuclear power workers, could be equipped with a real-time, inexpensive neutron detector based on this technology.

In one embodiment of the invention, a wearable solid state neutron detector which would signal the presence of thermal neutrons via a boron capture process is provided. The resulting alpha particle will create a fast charge signal which is amplified and digitally counted as a detected neutron. Since the chemical species present in the detector (boron, nitrogen) have a low atomic number Z, the detector is insensitive to background gamma rays and cosmic rays, the neutron-boron nuclear reaction within the detector material (cubic BN) being very specific.

Unlike the previous designs described in U.S. Pat. Nos. 5,940,460 and 5,969,359, in this device the detection occurs in the same layer or film where the electrical signal is produced, similar by analogy but operating by a different mechanism than that described in U.S. Pat. No. 6,921,903. This conceptually different approach allows for larger values of the overall quantum efficiency.

While embodiments of the invention have been illustrated and described herein, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A solid state neutron detector comprising:
    a p-doped neutron reactive layer and an n-doped neutron reactive layer wherein at least one of the neutron reactive layers is a thin film semiconductor layer of BN being responsive to energetic neutrons incident thereon to produce charged reaction particles and to detect the charged reaction particles within the thin film semi-conductor layer and wherein the detector has a thin film planar diode structure.

2. The detector as claimed in claim 1, further comprising top and bottom electrodes wherein the charged reaction particles include alpha particles and wherein the thin film semiconductor layer of BN is thick enough to capture substantially all of the energy of the alpha particles, the alpha particles exciting carriers which are collected at the electrodes.

3. The detector as claimed in claim 1, wherein the BN is cubic BN.

4. The detector as claimed in claim 1, wherein the BN is a hexagonal form of BN.

5. The detector as claimed in claim 1, wherein the BN is a nanocrystalline form of BN.

6. The detector as claimed in claim 1, wherein the BN is a turbostratic form of BN.

7. The detector as claimed in claim 1, wherein the BN is an amorphous form of BN.

8. The detector as claimed in claim 1, wherein the BN is in the form of doped n-type.

9. The detector as claimed in claim 1, wherein the BN is in the form of doped p-type.

10. The detector as claimed in claim 1, wherein the BN is in the form of a p-i-n diode.

11. The detector as claimed in claim 1, wherein one of the layers is a semiconductor substrate layer.

12. The detector as claimed in claim 11, wherein the semiconductor is intrinsic.

13. The detector as claimed in claim 11, wherein the semiconductor is a doped n-type semiconductor.

14. The detector as claimed in claim 11, wherein the semiconductor is a doped p-type semiconductor.

15. A method for measuring neutron emissions, the method comprising:
    positioning at least one solid-state neutron detector of claim 1 having a thin film of BN to receive the neutron emissions, the concentration of boron being sufficient to generate neutron-induced ionizing radiation in response to neutron absorptions and for generating an electrical signal in response to the neutron absorptions; and
    processing the electrical signal to obtain a measurement of the neutron emissions.

16. A system for measuring neutron emissions, the system comprising:
    at least one solid-state neutron detector of claim 1 having a thin film of BN to receive the neutron emissions, the concentration of boron being sufficient to generate neutron-induced ionizing radiation in response to neutron absorptions and for generating an electrical signal in response to the neutron absorptions; and
    a signal processor for processing the electrical signal to obtain a measurement of the neutron emissions.

17. An array of solid-state neutron detectors, at least one of the detectors comprising a detector of claim 1, the detectors measuring neutron emissions, each of the detectors having a thin film of BN to receive the neutron emissions, the concentration of boron being sufficient to generate neutron-induced ionizing radiation in response to neutron absorptions and for generating an electrical signal in response to the neutron absorptions.

18. An imaging system for imaging neutron emissions, the system comprising:
    an array of solid-state neutron detectors, at least one of the detectors comprising a detector of claim 1, each of the detectors having a thin film of BN to receive the neutron emissions, the concentration of boron being sufficient to generate neutron-induced ionizing radiation in response to neutron absorptions and for generating an electrical signal in response to the neutron absorptions; and
    an array of sheets of high-density material for separating adjacent solid-state detectors.

* * * * *